US005245827A

United States Patent [19]

Durant et al.

[11] Patent Number: 5,245,827

[45] Date of Patent: Sep. 21, 1993

[54] SUPPLY VALVE ARRANGEMENT FOR CLOSED CENTER HYDRAULIC SYSTEM

[75] Inventors: Douglas M. Durant; Larry M. Delfs, both of Waterloo; Derek M. Eagles, Cedar Falls, all of Iowa; Ronald L. Pratt, Taylor Ridge, Ill.

[73] Assignee: Deere & Company, Moline, Ill.

[21] Appl. No.: 923,762

[22] Filed: Aug. 3, 1992

[51] Int. Cl.[5] ............................................ F16D 31/02

[52] U.S. Cl. ........................................ 60/422; 60/452; 91/170 R; 91/513

[58] Field of Search ................. 60/420, 422, 443, 452, 60/465; 91/170 R, 513

[56] References Cited

U.S. PATENT DOCUMENTS 3,486,334 12/1969 Miller .................................... 60/452
4,023,646 5/1977 Heisig et al. .
4,046,399 9/1977 Zeuner et al. .
4,050,596 9/1977 Zeuner et al. .
4,107,924 8/1978 Dezelan ............................... 60/452
4,276,811 7/1981 Zeuner et al. .
4,401,009 8/1983 Zeuner et al. .
4,589,437 5/1986 Zeuner et al. .
5,077,975 1/1992 Kauss .................................... 60/452

*Primary Examiner*—Edward K. Look
*Assistant Examiner*—F. Daniel Lopez

[57] ABSTRACT

A hydraulic system includes a hydraulic pump which provides pressurized fluid at an output port as a function of pressure in a load sensing port, a hydraulic reservoir, and a load pressure sensing line connected to the load sensing port. A solenoid operated implement control valve controls fluid communication to and from a hydraulic function such as a cylinder. A supply control valve has a first position wherein the reservoir is communicated with the load sensing port and a second position wherein the pump output port is communicated with the load sensing port. A spring urges the valve member to its first position, and a solenoid is energizable to move the valve member to its second position. The solenoid is energized when the implement control valve is activated so that the supply control valve communicates pump pressure to the load sensing port and the pump will operate at full capacity whenever the second hydraulic function is operated.

4 Claims, 3 Drawing Sheets

SUPPLY VALVE ARRANGEMENT FOR CLOSED CENTER HYDRAULIC SYSTEM

BACKGROUND OF THE INVENTION

This invention relates to hydraulic system, and particularly to a hydraulic system wherein a hydraulic function without load pressure sensing capability is supplied with fluid from the pump of a closed center hydraulic system with load pressure sensing.

Some agricultural tractors have closed centered pressure and flow compensated (POD) hydraulic systems. In contrast, some implements to be connected to agricultural tractors have hydraulic systems or components which are designed for constant pressure hydraulic systems. Thus, when a tractor control valve of such a tractor hydraulic system is used as the source of hydraulic fluid for one or more controlled hydraulic functions on an implement with such an implement hydraulic system, this results in the tractor running at maximum system operating pressure which generates higher power consumption resulting in increased fuel consumption and additional heat generation.

One solution to this problem is to equip the tractor with a non-controlled pressure source and a return source and to install a hydraulic load sense line on the implement which senses the hydraulic pressure of the implement function. This approach requires modification of the implement hydraulics (circuitry or valving) and can become very complicated and expensive when multiple functions are involved.

A second solution involves using valve packages typically supplied for implements with closed centered hydraulic systems when they are connected to tractors with open centered hydraulic systems. This valve package uses an implement electrical control signal to operate an unloading valve in the valve package. In this mode of operation, the operator must carefully adjust the tractor valve, which supplies the flow, to minimize power loss. Even with this adjustment, flow is continuous even when the implement functions are not operating and thus wasting power. It would be desirable to provide a solution which avoids the above described problems.

SUMMARY OF THE INVENTION

Accordingly, an object of this invention is to provide a simpler and more efficient interface between an implement hydraulic function and a closed centered pressure and flow compensated hydraulic system.

A further object of the invention is to provide such an interface which does not require extensive hydraulic plumbing or valve modifications to have a load sense signal provided in the case of multiple function implements.

Another object of the invention is to provide such an interface which can operate at low electrical power levels and which provides only the load sense signal required to send the system pump to maximum pressure.

These and other objects are achieved by the present invention, wherein a tractor hydraulic system includes a hydraulic pump which provides pressurized fluid at a pump output port as a function of pressure in a load sensing port. An implement or function control valve controls communication between the pump, a sump and a hydraulic function. An electrohydraulic supply control valve controls communication between the pump output port, the load sensing port and the sump, and includes a valve member which is spring biassed to a first position wherein the load sensing port is communicated with the sump. A solenoid is energized to move the supply control valve to a second position wherein the pump output port is communicated with the load sensing port to maximize system pressure. A control circuit energizes the solenoid when the implement control valve is activated and de-energizes the solenoid when the implement control valve is de-activated. A tractor hitch control valve may function as the supply control valve or a separate supply control valve may be provided.

DETAILED DESCRIPTION

Figure 1:
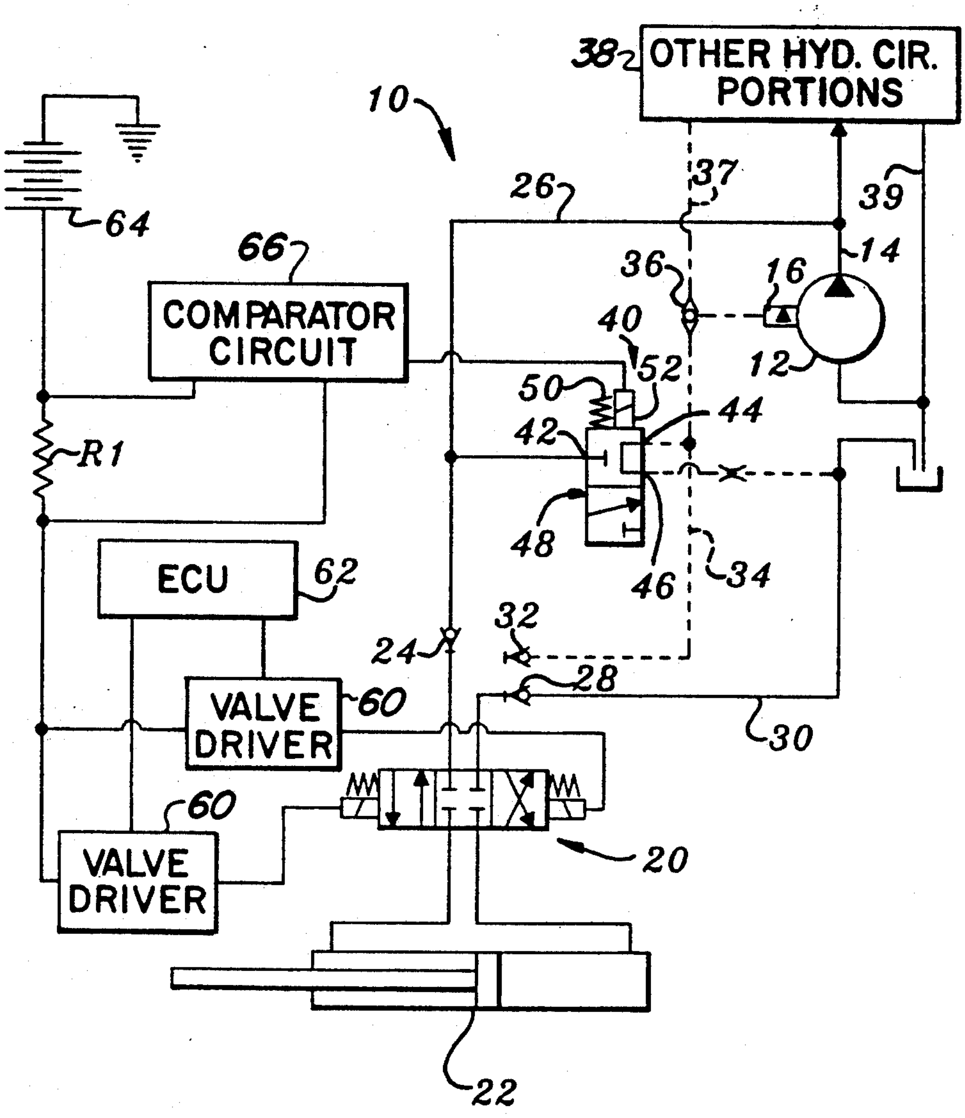
FIG. 1 is a schematic diagram of a hydraulic system according to one embodiment of the present invention.

Referring now to FIG. 1, reference numeral 10 represents a portion of a closed center hydraulic system, such as the hydraulic system of an agricultural tractor (not shown). This portion of the hydraulic system includes a pump 12 which provides pressurized fluid at line 14 as a function of the load pressure sensed at load sensing port 16 and a sump or reservoir 18. This portion 10 of the hydraulic system also includes a pilot or servo or solenoid operated implement or function control valve 20 (only one is illustrated) for controlling communication between the pump, the sump and a hydraulic function, such as a hydraulic cylinder 22 on an implement (not shown) which may be attached to the tractor (not shown). Although the valve 20 illustrated is solenoid operated, this invention would also function in connection with hydraulically or air pilot operated valves. The valve 20 may be located on the implement (not shown) or on the tractor (not shown). The system may also include additional solenoid or servo or manually operated function control valves (not shown) for controlling additional hydraulic functions. The pump port of valve 20 is connected to pump output line 14 via connector 24 and line 26. The return port of valve 20 is connected to sump 18 via connector 28 and line 30. The tractor hydraulic system may also include a connector 32 and line 34 connected to the load sensing port 16 via shuttle valve 36, although in the design of this invention, connector 32 is blocked and unused. Other portions 38 of a tractor hydraulic system are connected to portion 10 by pump line 14, by load sense line 37 and return line 39.

According to the present invention, a solenoid or servo operated valve or supply control valve 40 has a housing having a first port 42 connected to the pump output port 14, a second port 44 connected to the load sensing port 16 via shuttle valve 36, a third port 46 connected to the sump 18. Valve 40 has a valve member 48 movable to a first position wherein the first port 42 is blocked and the second port 44 is communicated with the third port 46, and to a second position wherein the first port 42 is communicated with second port 44 and the third port 46 is blocked. A spring 50 is biassed to urge the valve member to its first position, and a servo device 52, such as a solenoid, is energizable to move the valve member 48 to its second position.

Each solenoid of function control valve 20 is preferably controlled by a valve driver 60, such as described in Boe et al U.S. Pat. No. 4,964,014, issued Oct. 16, 1990, and assigned to the applicant's assignee, which is incorporated by reference herein. The drivers 60 may be controlled by an electronic control unit 62, such as described in Wiegardt et al U.S. Pat. No. 4,518,044, issued May 21, 1985, and assigned to the applicant's assignee, which is also incorporated by reference herein. Each driver 60 is supplied with power from a battery 64 via a current sensing resister R1. If any one or more of the drivers 60 is energized, then a comparator circuit 66 reacts to the voltage across resister 66 and energizes solenoid 52 of valve 40. Thus, solenoid 52 will be energized to move valve 40 to its second position whenever any one or more of the solenoids of the control valve 20 is activated and valve 40 will remain in its first position whenever none of the solenoids of the control valve 20 are activated.

Thus, whenever any one the solenoids of the control valve 20 is activated, the valve 40 communicates pump output pressure to load sensing port 14 and the pump 12 of hydraulic system will provided maximum pressure. This design provides a high flow capacity to the control valve 20 and to the implement cylinder 22 and allows the use of a small valve 40 which can operate at low electrical power levels since valve 40 provides only the low flow rate load sense signal required to send the pump 12 to maximum pressure.

With this design, the hydraulic system will operate at high pressure only when the implement hydraulic cylinder 22 is operated and the pump 12 will be required to provide only the flow needed. Such a design is especially advantageous in the case of multiple function implements using intermittantly operated cylinders which would otherwise require extensive hydraulic plumbing or valve modifications to have a load sense 10 signal provided. In these cases, the customer is more likely to dedicate a implement control valve and operate the tractor at continuous high system pressure. It should be noted that any electrohydraulic valve on the tractor could be utilized to control the fluid pressure communicated to the pump load sense port. In would even be possible to use the tractor hitch control valve in this capacity, as will hereafter be described.

Figure 2:
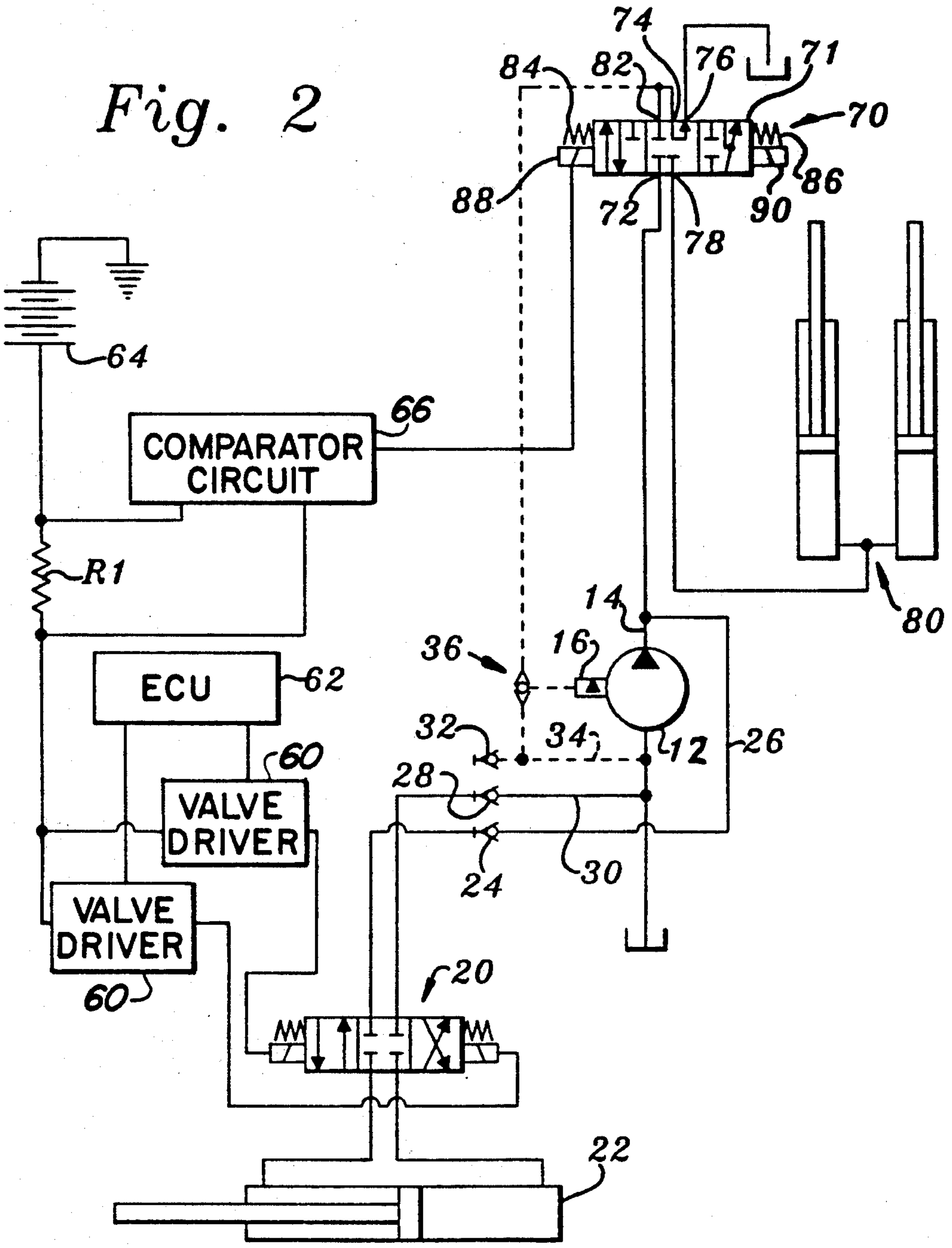
FIG. 2 is a schematic diagram of a hydraulic system according to an alternate embodiment of the present invention.

Referring now to FIG. 2, an alternate embodiment is shown wherein the valve 40 is replaced by a hitch control valve 70. Valve 70 includes a housing having a first port 72 connected to the pump output port 14, a second port 74 connected to the load sensing port 16 via shuttle valve 36, a third port 76 connected to the sump 18, a fourth port 78 connected to the hitch cylinders 80 and a fifth port 82 connected to connected to the load sensing port 16 and to the second port 74.

Valve 70 has a valve member 71 movable to a first or neutral position wherein the first port 72, the fourth port 78 and the fifth port 82 are blocked and the second port 74 is communicated with the third port 76. Valve member 71 is also movable to a second (or raise) position wherein the first port 72 is communicated with fifth port 82, the second port 74 is communicated with the fourth port 78 and the third port 46 is blocked. Valve member 71 is also movable to a third (or lower) position wherein the first port and the fifth port 82 are blocked and the second and fourth ports are communicated with the third port. Springs 84 and 86 are biassed to urge the valve member 71 to its first position, and solenoids 88 and 90 are energizable to move the valve member 48 to its second and third positions.

With the embodiment of FIG. 2, whenever any one of the solenoids of the control valve 20 is activated, the valve 70 will be moved to its second position where pump output pressure is communicated to load sensing port 14 and the pump 12 of hydraulic system 10 will provided maximum pressure. At the same time, pump output pressure is communicated to the hitch cylinders 80 so that they will be fully extended. This assures that whenever the control valve 20 is utilized, the hitch (not shown) will be fully raised so as not to interfere with operation of the hydraulic cylinder 22 on the implement (not shown).

Figure 3:
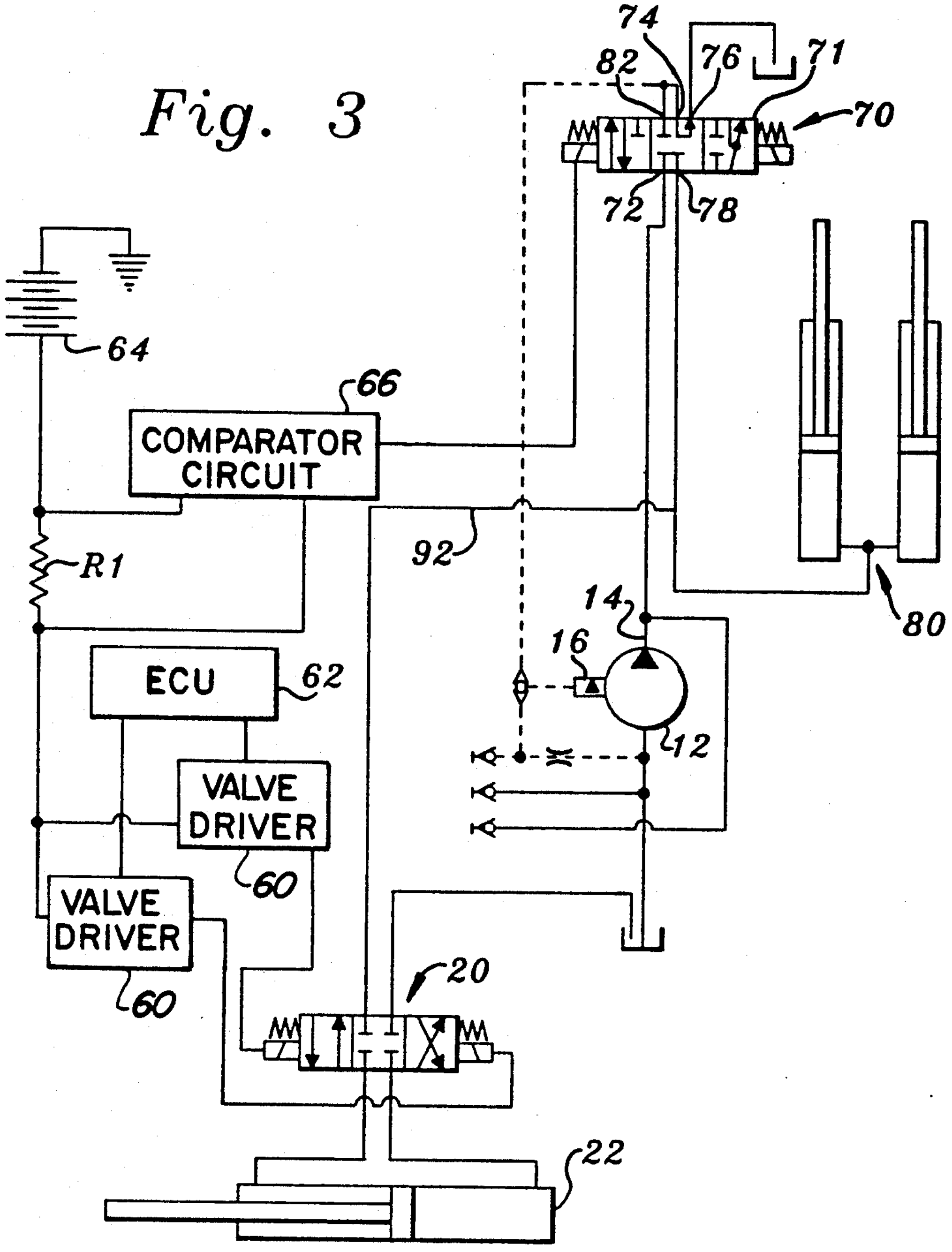
FIG. 3 is a schematic diagram of a hydraulic system according to another embodiment of the present invention.

The embodiment of FIG. 3 is similar to the embodiment of FIG. 2, but in the embodiment of FIG. 3 there is no line connecting the pump output directly to an inlet of the control valve 20. Instead, a line 92 connects the fourth port 78 with an inlet of the implement control valve 20. Thus, with the embodiment of FIG. 3, the valve 70 will control fluid communication to load sensing port 14 and will also control fluid communication between the pump 12 and the control valve 20. In the embodiments of FIGS. 2 and 3, the hitch cylinders 80 could be disconnected from valve 70 because they are to remain fully extended as long as the control valve 20 is to be operated.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A hydraulic system comprising:

a hydraulic pump which provides pressurized fluid at a pump output port as a function of pressure in a load sensing port;

a hydraulic reservoir;

a hydraulic function;

a function control valve for controlling communication between the pump, the reservoir and the hydraulic function;

a further valve comprising a first port connected to the pump output port, a second port connected to the load sensing port, a third port connected to the reservoir, a valve member movable to a first position and to a second position, a spring biassed to urge the valve member to its first position, and servo means for moving the valve member to its second position, the further valve comprising a hitch control valve for controlling fluid communication between the pump, the reservoir and a hitch cylinder of an agricultural vehicle hitch system, the further valve also comprising a fourth port communicated with the hitch cylinder, and a fifth port connected to the load sensing port, the valve member being movable to said first position wherein the first, fourth and fifth ports are blocked and the second position wherein the first port is communicated with the fifth port, the second port is communicated with the fourth port and the third port is blocked, and servo means for moving the valve member to a third position wherein the first and fifth ports are blocked and the second and third ports are communicated with the fourth port; and means for actuating the servo means when the function valve is activated and for de-actuating the servo means when the function control valve is de-activated.

2. The hydraulic system of claim 1, wherein:

the pump output is communicated with an inlet of the function control valve.

3. The hydraulic system of claim 1, wherein:

the valve member is movable to said third position wherein the first and fifth ports are blocked and the second and fourth ports are communicated with the third port.

4. The hydraulic system of claim 1, wherein the fourth port is communicated with the hitch cylinder and with an inlet of the function control valve.

* * * * *

UNITED STATES PATENT AND TRADEMARK OFFICE

CERTIFICATE OF CORRECTION

PATENT NO. : 5,245,827

DATED : 21 September 1993

INVENTOR(S) : Douglas Michael Durant et al.

It is certified that error appears in the above-indentified patent and that said Letters Patent is hereby corrected as shown below:

In Col. 4, line 63, after "second", insert -- port is communicated with the third port and to said second --.

Signed and Sealed this

Twentieth Day of September, 1994

Attest:

BRUCE LEHMAN

Attesting Officer

*Commissioner of Patents and Trademarks*